(12) United States Patent
Collet et al.

(10) Patent No.: US 6,174,019 B1
(45) Date of Patent: Jan. 16, 2001

(54) EXTRUDED VISOR CONTROL

(75) Inventors: Corbin L. Collet; James B. Price, both of Holland; John P. Maurer, West Olive, all of MI (US)

(73) Assignee: Prince Corporation, Holland, MI (US)

( * ) Notice: Under 35 U.S.C. 154(b), the term of this patent shall be extended for 0 days.

(21) Appl. No.: 09/031,405

(22) Filed: Feb. 26, 1998

(51) Int. Cl.⁷ .................................................. B60J 3/02
(52) U.S. Cl. ................................................ 296/97.11
(58) Field of Search ........................ 296/97.9, 97.11, 296/97.12, 97.1; 248/286.1, 292.14; 16/335, 362, 386

(56) References Cited

U.S. PATENT DOCUMENTS

| | | |
|---|---|---|
| 1,625,510 | 4/1927 | Tredwell . |
| 1,862,432 | 6/1932 | Rose . |
| 2,038,906 | 4/1936 | Ruhland . |
| 2,221,182 | 11/1940 | Davies . |
| 2,223,845 | 12/1940 | Davies . |
| 2,279,542 | 4/1942 | Westrope . |
| 2,279,648 | 4/1942 | Westrope . |
| 2,294,317 | 8/1942 | Pelcher et al. . |
| 2,299,775 | 10/1942 | Westrope . |
| 2,304,223 | 12/1942 | Westrope . |
| 2,322,898 | 6/1943 | Van Dresser . |
| 2,340,015 | 1/1944 | Pelcher et al. . |
| 2,458,677 | 1/1949 | Brundage . |
| 2,458,707 | 1/1949 | Jacobs . |
| 2,462,304 | 2/1949 | Burdick . |
| 2,583,857 | 1/1952 | Koppinger . |
| 2,596,397 | 5/1952 | Greig et al. . |
| 2,622,922 | 12/1952 | Shroeder . |
| 2,625,426 | 1/1953 | Weymouth . |
| 3,032,371 | 5/1962 | Berridge et al. . |
| 3,059,961 | 10/1962 | Jacobs . |
| 3,061,887 | 11/1962 | Clarke . |
| 3,188,685 | 6/1965 | Fletcher . |
| 3,556,585 | 1/1971 | Binder . |
| 3,627,868 | 12/1971 | Funshashi . |
| 3,765,054 | 10/1973 | Johnson . |
| 4,057,287 | 11/1977 | Lilja . |
| 4,256,388 | 3/1981 | Beyer . |
| 4,385,023 | 5/1983 | Sumi . |
| 4,489,974 | 12/1984 | Warhol . |
| 4,521,046 | * 6/1985 | Foggini .............................. 296/97.12 |
| 4,582,356 | 4/1986 | Kaiser et al. . |
| 4,617,699 | 10/1986 | Nakamura . |
| 4,925,233 | 5/1990 | Clark . |

(List continued on next page.)

FOREIGN PATENT DOCUMENTS

| | | | |
|---|---|---|---|
| 1354485 | 5/1974 | (GB) . | |
| 57-11114 | * 1/1982 | (JP) | ................................... 296/97.9 |
| 57-140222 | 8/1982 | (JP) . | |
| 263551 | 10/1988 | (JP) . | |
| 5138665 | 6/1993 | (JP) . | |
| 5157118 | 6/1993 | (JP) . | |
| 5286363 | 11/1993 | (JP) . | |
| 5-286363 | * 11/1993 | (JP) | .................................. 296/97.11 |

\* cited by examiner

*Primary Examiner*—Dennis H. Pedder
(74) *Attorney, Agent, or Firm*—Price, Heneveld, Cooper, DeWitt & Litton

(57) ABSTRACT

A slide assembly for a sliding visor includes a sleeve which is concentrically positioned around a visor pivot rod and a polymeric slide extruded in situ with between the sleeve and pivot rod and extending along at least a portion of the sleeve to provide a sliding lubricous polymeric interface between the pivot rod and sleeve. The sleeve, in turn, is mounted to the visor body with a torque control allowing controlled rotation of the visor with respect to the pivot rod. In a preferred embodiment of the invention, the sleeve is keyed to prevent rotation of the slide and pivot rod with respect to the sleeve, and the visor body includes stops for limiting the motion of the visor body and sleeve with respect to the fixed pivot rod mounted to the vehicle.

13 Claims, 3 Drawing Sheets

U.S. PATENT DOCUMENTS

| | | |
|---|---|---|
| 4,964,193 | 10/1990 | Rommelfaenger et al. . |
| 4,981,348 * | 1/1991 | Prillard ............................... 16/335 X |
| 4,988,139 | 1/1991 | Yamada . |
| 4,998,765 | 3/1991 | Van Order et al. . |
| 5,026,108 | 6/1991 | Leahy . |
| 5,044,687 | 9/1991 | Abu-Shumays et al. . |
| 5,115,552 | 5/1992 | Mattson . |
| 5,161,850 | 11/1992 | Redder et al. . |
| 5,199,132 | 4/1993 | Gabas . |
| 5,409,285 | 4/1995 | Snyder et al. . |
| 5,491,874 | 2/1996 | Lowry et al. . |
| 5,603,547 * | 2/1997 | Finn et al. ......................... 296/97.12 |
| 5,645,308 | 7/1997 | Fink . |
| 5,653,490 | 8/1997 | Fink et al. . |
| 5,678,880 | 10/1997 | Keller . |
| 5,934,734 * | 8/1999 | Wilson .............................. 296/97.11 |

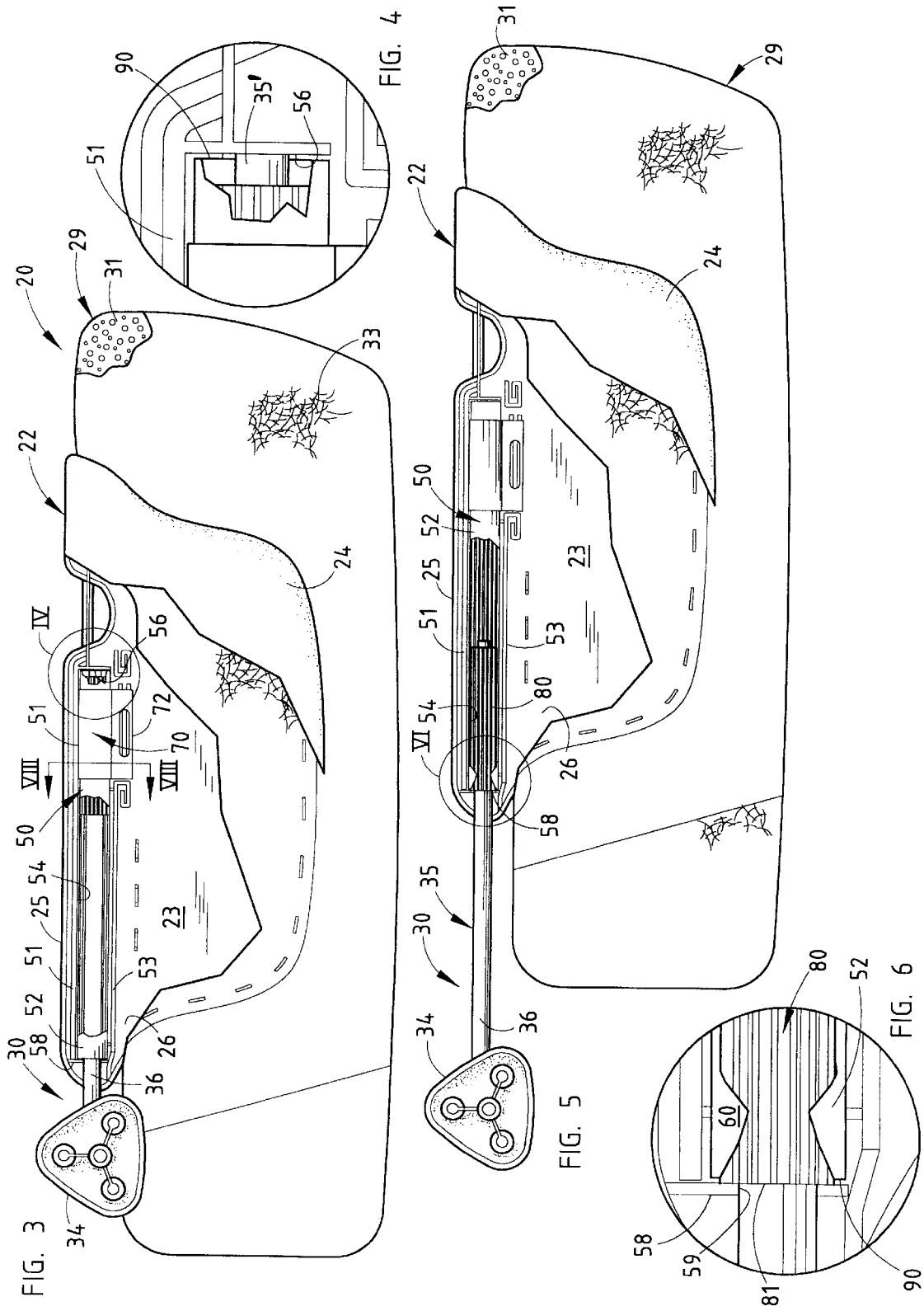

EXTRUDED VISOR CONTROL

BACKGROUND OF THE INVENTION

The present invention relates to visors for vehicles and particularly to a visor which can slide along an elongated pivot rod and having a control which is extruded within a support sleeve.

Visors typically include a visor panel mounted to a pivot rod assembly allowing the visor to move from a raised stored position against the vehicle headliner to a lowered use position adjacent the windshield. Typically, the pivot rod assembly allows the visor to also move to a side window position to block incident sunlight from the side. Several such visor systems employ mechanisms to allow the visor to slide along an elongated pivot rod such that, when the visor is in a lowered use position, the visor can slide along the pivot rod to allow adjustment of the visor to block incident light. U.S. Pat. Nos. 4,925,233; 4,998,765; 5,409,285; 5,645,308; and 5,653,490 are representative of such sliding visor assemblies.

In order to hold a visor in a raised stored position and control its position in selected lowered use positions, conventional visor assemblies typically utilize an internal torque control which provides an interface between the visor body and the visor pivot rod to provide not only a snap-up locking control for the visor against the vehicle headliner when stored but also a predetermined rotational holding torque allowing the visor to be moved to selected lowered use positions. When it is desired to provide a visor which slides along the pivot rod, the conventional torque control typically will not allow the sliding motion of the visor and either a separate mechanism is necessary to provide the desired sliding action and yet allow operation of the conventional torque control or an entirely different control mechanism is necessary. Although the sliding visors noted above provide the desired sliding action and snap-up and rotational control of visors, there remains a need for a relatively inexpensive small and lightweight system which is reliable and provides the desired sliding and rotational torque control for a visor assembly.

SUMMARY OF THE PRESENT INVENTION

The visor system of the present invention provides a unique sliding assembly for a slidable visor by providing a sleeve which is concentrically positioned around a visor pivot rod and a polymeric slide extruded in situ onto the pivot rod in the sleeve. The slide extends along at least a portion of the sleeve to provide a lubricous polymeric sliding interface between a visor mounted to the sleeve and the pivot rod mounted to a vehicle. The sleeve is mounted to a visor body with torque control allowing the rotation of the visor body with respect to the sleeve. In a preferred embodiment of the invention, the sleeve is keyed to prevent rotation of the slide and pivot rod with respect to the sleeve, and the visor body includes stops for limiting the motion of the visor body and sleeve with respect to the pivot rod. By injection molding the slide directly within the sleeve surrounding the pivot rod, an integral structure with the desired sliding friction and tolerance control is assured in a relatively inexpensive construction which is durable, lightweight and relatively inexpensive to manufacture.

These and other features, objects and advantages of the present invention will become apparent upon reading the following description thereof together with reference to the accompanying drawings.

BRIEF DESCRIPTION OF THE DRAWINGS

FIG. 3 is an enlarged front elevational view of the visor shown in FIGS. 1 and 2, partly broken away, of the visor control of the present invention and its relationship to the visor body;

FIG. 4 is a greatly enlarged view of one end of the visor body and control, shown partly broken away, as seen in the circled area IV in FIG. 3, shown with the visor in a first position with respect to the visor rod;

FIG. 5 is an enlarged front elevational view, partly broken away, of the visor shown in FIG. 3 with the visor moved to a fully extended position;

FIG. 6 is a greatly enlarged broken away view of the circled area VI shown in FIG. 5;

DETAILED DESCRIPTION OF THE PREFERRED EMBODIMENT

Figure 1:
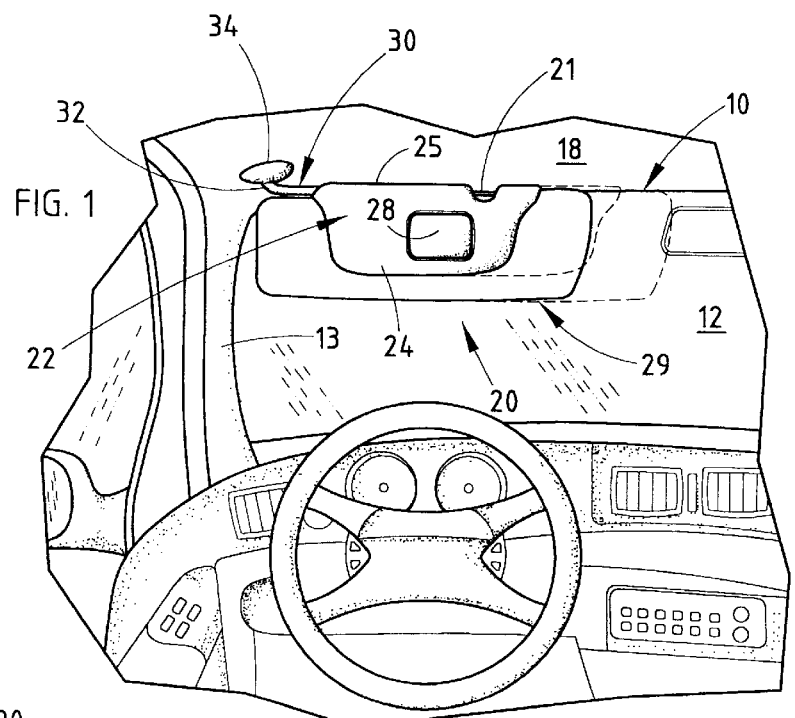
FIG. 1 is a fragmentary perspective view of a vehicle including a visor system of the present invention, shown with the visor in a first lowered use position and partly in phantom form showing the sliding adjustment of the visor.
Figure 2:
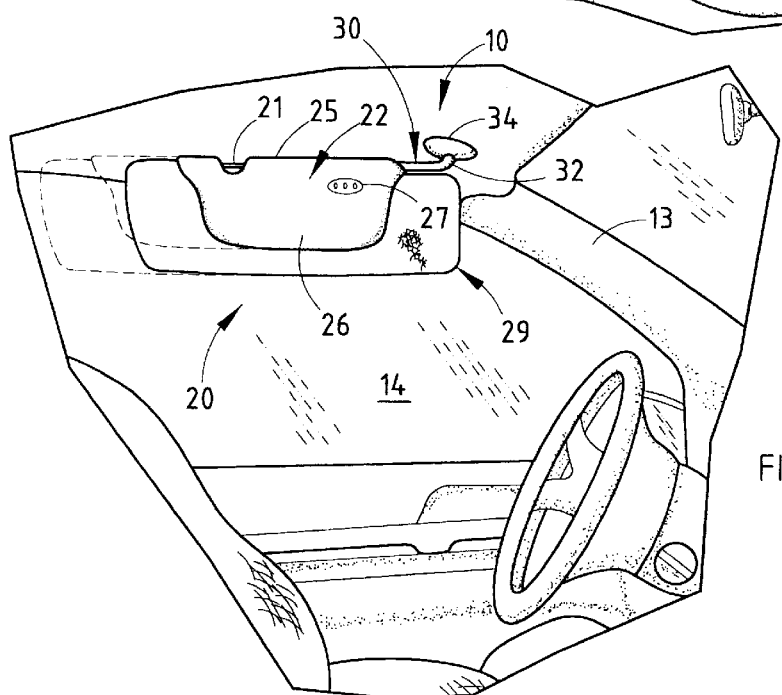
FIG. 2 is a fragmentary perspective view of the vehicle shown in FIG. 1, showing the visor at a side window position.

Referring initially to FIGS. 1 and 2, there is shown a vehicle 10, such as an automobile, which includes a visor assembly 20 embodying the present invention. The visor assembly 20 is mounted to the roof of the vehicle by means of a visor pivot rod assembly 30, which extends within the visor body as described below and which has an end 32 mounted to a pivot rod mounting bracket 34 for attaching the pivot rod end 32 to the vehicle roof and allowing the visor to move from a windshield position, as shown in FIG. 1, to a side window position, shown in FIG. 2. The bracket 34 attaches the elbow end 32 of the visor pivot rod assembly 30 to the underlying sheet metal structure of the vehicle roof. The vehicle includes a windshield 12 and a side window 14 separated by an A-pillar 13 with the visor 20 providing blocking of incident sunlight along either the windshield 12, as seen in FIG. 1, or along the side window 14, as shown in FIG. 2. Additionally, as shown in phantom form in FIGS. 1 and 2, the visor assembly 20 can slide along visor pivot rod assembly 30 toward and away from pivot mounting bracket 34 to adjust the position of the visor along the longitudinal length of visor pivot rod assembly 30. The elbow bracket 34 can be of conventional construction or a twist-in type as disclosed in U.S. Pat. No. 5,242,204. In order to support the visor along the front windshield position in a raised stored position against the vehicle headliner 18 when stored, an auxiliary mounting rod 21 may be included with the visor and which is snap-received in a clip (not shown) mounted to the vehicle roof when it is not necessary to slide the visor along the pivot rod.

The visor assembly 20 may include a main folded butterfly-type body 22 made of a suitable polymeric material such as polypropylene including a front wall 24 facing the interior of the vehicle when the visor is in a lowered use position, as shown in FIG. 1, and a rear wall 26 facing the vehicle interior when the visor is in the position shown in FIG. 2. Walls 24 and 26 may be joined along an integrally formed hinge 25 extending along the top edge of the visor assembly 20 or body 22 may also be made of separate walls such as 24 and 26. Mounted within wall 24 is an illuminated vanity mirror assembly 28. Wall 26 of the visor body 22 includes a programmable garage door opener transmitter 27 of the type described in U.S. Pat. No. 5,442,340, such that, when the visor is in a raised stored position against the vehicle headliner 18, the transmitter control switches are accessible by the vehicle operator for operating a remote controlled garage door opening mechanism.

The visor assembly 20 also includes a blade section 29 comprising a foam polymeric body 31 (FIGS. 3 and 5), such as a polyurethane foam, having a thickness of about 18 mm and which is covered by a decorative material 33 such as a foam back fabric. The lightweight blade is clamped between the walls 24 and 26 of visor body 22 by ultrasonically welding the walls 24 and 26 together, sandwiching the blade therebetween or by other suitable attachment means such as snap-together fasteners or the like. The body 31 and mounting relationship to body 22 can be generally of the structure disclosed in U.S. Pat. No. 5,716,092, the disclosure of which is incorporated herein by reference. The result is a relatively large but lightweight visor providing a large area of incident sunlight blocking capabilities and which is adjustable along the length of visor pivot rod assembly 30 utilizing the control mechanism now described.

In FIGS. 3 and 5, the visor wall 24 is cut away to expose the inner surface 23 of opposite wall 26, it being understood that the inner surface of wall 24 comprises a symmetrically mating construction for holding the visor control 50 of the present invention within the visor body 22. The visor control 50 comprises a generally cylindrical sleeve 52 which is received within a pair of semi-cylindrical recesses 54 integrally molded in the top of visor walls 24 and 26 under the integral fold line 25 along the top edge of the polymeric visor body. Recesses 54 each include a first or right end wall 56, as best seen in FIGS. 3 and 4, and a left end wall 58, as seen in FIGS. 5 and 6, which confine the cylindrical sleeve 52 from longitudinal movement within the elongated semi-cylindrical recess 54 in wall 26 and the mating recess in wall 24. Wall 58 includes an aperture 59 (FIG. 6) allowing the pivot rod shaft 35 to extend from the visor body. As seen in FIGS. 5 and 6, the end wall 58 provides a stop against which the end 81 of slide 80 engages, when the visor is in a fully extended position, while the end 35' of visor rod 35 engages the wall 56, when the visor is in a fully retracted position as seen in FIGS. 3 and 4. Thus, the end walls 56 and 58 of the sleeve receiving recess 54 define the travel limits for the sliding visor assembly 20. The semi-cylindrical recesses terminate in an upper edge 51 near edge 25, and a lower edge 53, preventing lateral movement of the cylindrical sleeve 52 within the recesses 54 so formed. Thus, when assembled, the cylindrical recess 54 prevents rattling of the cylindrical sleeve 52 therein but allows rotation of the sleeve with respect to the visor body.

Figure 8:
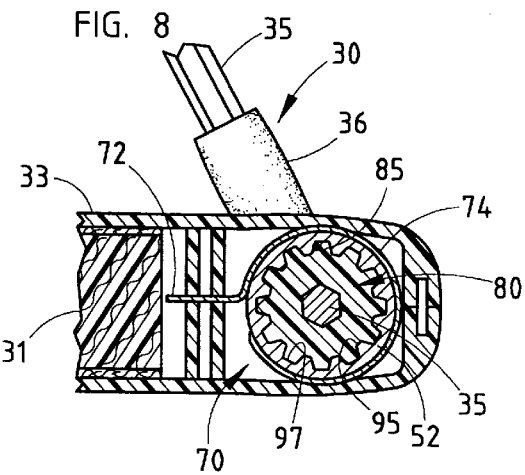
FIG. 8 is an enlarged fragmentary cross-sectional view of the visor control of the present invention taken along section lines VIII—VIII in FIG. 3.

Coupled to the outer surface 60 of the cylindrical sleeve 52 is a torque control clip 70 having a downwardly extending tang 72 which is attached to wall 26 and, therefore, fixedly attached to the visor body and which has a curvilinear polytetrafluoroethylene, such as TEFLON®, coated body 74, as best seen in FIG. 8, which circumscribes the cylindrical sleeve 52 and provides a rotational torque for controlling the rotation of visor assembly 20 about pivot rod assembly 30. This torque control can be of the construction described in pending U.S. patent application Ser. No. 08/835,998, filed Apr. 11, 1997, and entitled TORQUE CONTROL now U.S. Pat. No. 5,820,197. Sleeve 52 slidably interfaces with pivot rod assembly 30 by means of a polymeric molded slide 80 which is integrally extruded onto visor rod 35 within the sleeve 52 during manufacturing by the process described in connection with FIG. 7. The pivot rod assembly 30 includes an elongated metallic shaft which, in the embodiment shown, has a non-circular hexagonal cross section to prevent rotation of the polymeric slide 80 with respect to rod 35 when molded. Preferably, however, the rod is circular a thermoplastic resin, such as VALOX® and the shrinkage of the polymeric slide onto the rod prevents rotation therebetween.

Figure 7:
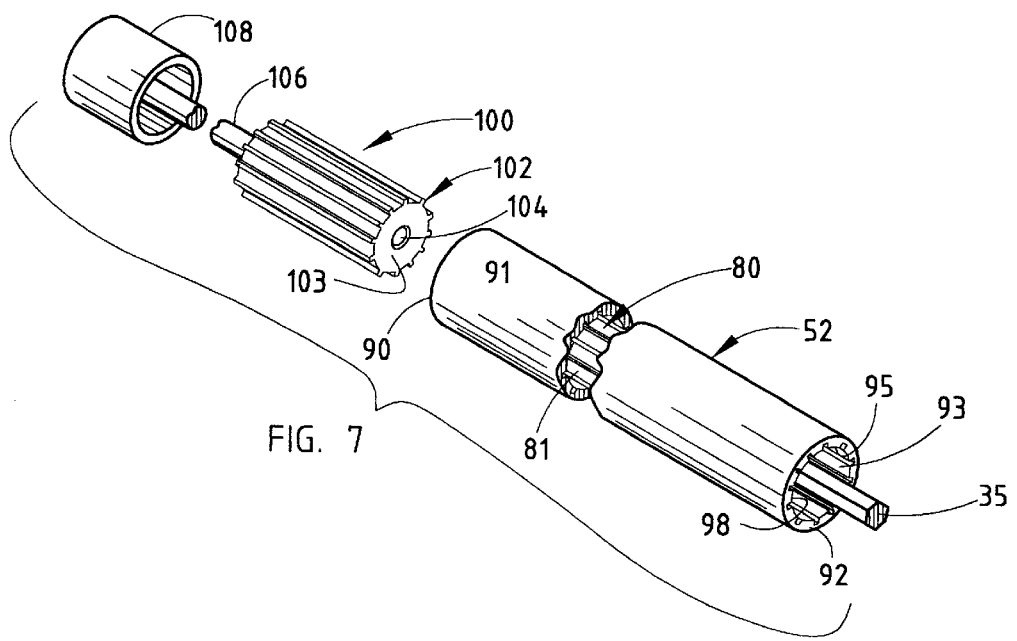
FIG. 7 is an exploded fragmentary perspective view of a portion of the visor control shown in FIGS. 1–6 and a manufacturing tool for the extrusion of the visor control of the present invention.

The slide 80 can be keyed to sleeve 52 in a variety of manners, as described in greater detail below in connection with FIGS. 8–11, to prevent rotation of the polymeric slide 80 with respect to sleeve 52. The slide is directly molded within sleeve 52 on rod 35 by positioning rod 35 as shown in FIG. 7 in concentric relationship with respect to the cylindrical sleeve 52, holding one end of the pivot rod in position with a manufacturing plug assembly 100 having a plug 102 at one end with an aperture 104 shaped to receive the free end 35' (FIG. 4) of pivot rod 35, supporting the end 35' of the pivot rod in aligned coaxial relationship with sleeve 52. Plug 102 has an external surface keyed to mate with the internal bore of sleeve 52. Plug 102 is slid within the sleeve by a push rod 106 a distance selected to obstruct an end of sleeve 52 a distance allowing the length of slide 80 to be molded for a given visor installation. Thus, the polymeric slide 80, as seen in FIGS. 3 and 6, has a length, in one embodiment, of approximately one fourth the overall length of the sleeve 52 in which it is extruded. The length can be varied as desired by the selective insertion of plug 102 into the sleeve during the manufacturing process. The manufacturing tool 100 includes a cap 108 at an end remote from plug 102 to align shaft 106 concentrically in sleeve 52 and has an inner bore selected to closely fit the outer cylindrical wall 91 of sleeve 52.

With the tool 100 in place, the assembly is placed in an injection molding machine for molding the slide in situ (i.e. in the sleeve 52 itself). This process assures the desired sliding interface between the visor and the visor rod. Thus, a polymeric material is injected into the open end 93 of sleeve 52, as shown in FIG. 7, with the polymeric material extending into the bore of sleeve 52 until blocked by the end wall 103 of plug 102. In the preferred embodiment, the length of rod 106 or tool 100 is selected to allow the sleeve 52 to fill approximately one fourth of the distance from end 93 to end 90 resulting in a slide 80 extending approximately one fourth the length of sleeve 52. The injection mold may be shaped to allow the simultaneous molding of a cylindrical cover 36 over the remaining section of pivot rod core 35 such that, as seen in FIG. 5, the pivot rod includes a decorative surface when the visor body 22 is extended from the mounting bracket 34. In a preferred embodiment of the invention, sleeve 52 was extruded of anodized aluminum type 6061T-6, while rod 35 was a 1008–1010 steel member having a circular cross section.

In the illuminated vanity mirror embodiment of the invention, rod 35 is hollow allowing an electrical conductor to extend therethrough for the activation of lamps contained within the vanity mirror assembly 28. The slide 80 is molded of a suitable lubricous polymeric material. In one embodiment, the slide was molded of a silicone-filled acetal, such as CELCON®, and injection molded at a pressure of from 2500 to 5000 p.s.i., with 3000 p.s.i. being preferred. The molding pressure can be adjusted to provide the desired "tightness" of the fit between slide 80 and the bore of sleeve 52 to control the sliding friction of a visor as can the overall length of the slide 80. In a preferred embodiment of the invention, the sleeve 52 had a length of about 7 inches, an outer diameter of ⅝ inch and had a splined inner bore, as best seen in FIGS. 7 and 8. The length of slide 80 in a preferred embodiment was approximately 2½ inches. The cover 36 is separately molded of a different material, such as a polyester or a thermoplastic resin, such as VALOX®, and can be separately insert-molded over rod 35 after the slide 80 is molded within sleeve 52. Thus, with the system of the present invention, the sliding interface between the visor body and the visor pivot rod is provided by a slide which is integrally molded within a guide sleeve and which is keyed thereto in a variety of manners as now described in connection with FIGS. 8–11.

In FIG. 8, the sleeve 52 is splined with a plurality of alternately staggered, inwardly projecting, generally tapered teeth 95 and recesses 97, which integrally receive the equally angularly spaced projections or teeth 85 of polymeric slide 80. This construction provides a splined-type sliding interface between slide 80 and the inner surface 98 of sleeve 52 and the outer surface 81 of slide 80 which, as can be appreciated upon cooling from injection, provides a slight amount of shrinking to allow the sliding motion between slide 80 and sleeve 52.

Figure 9:
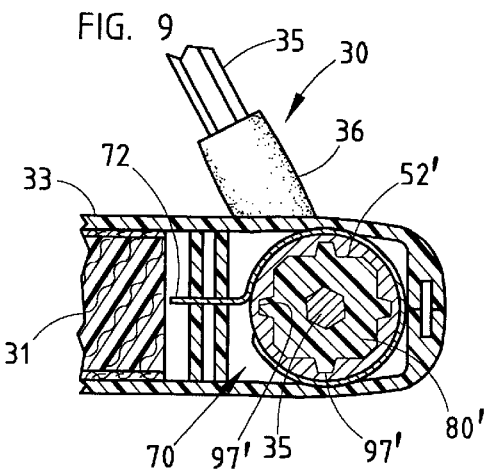
FIG. 9 is an enlarged fragmentary cross-sectional view of an alternative embodiment of the visor control of the present invention, taken along the same line as FIG. 8.

In another embodiment shown in FIG. 9, a generally cylindrical sleeve 52' is elongated and is keyed by four elongated slots 97' spaced at approximately 90° intervals around the internal peripheral surface 98' of sleeve 52'. This construction also provides a keyed interface between the sleeve 52' and correspondingly shaped slide 80'.

Figure 12:
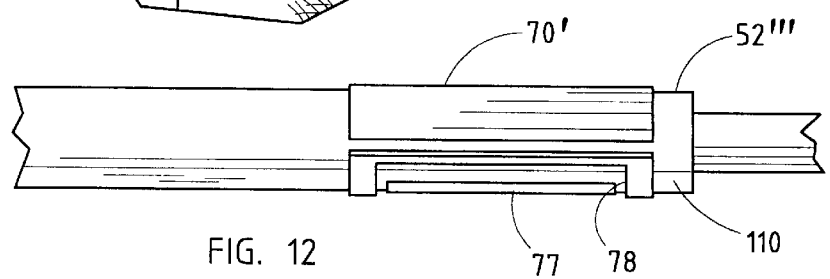
FIG. 12 is a fragmentary enlarged front elevational view of the visor control shown in FIGS. 10 or 11.
Figure 10:
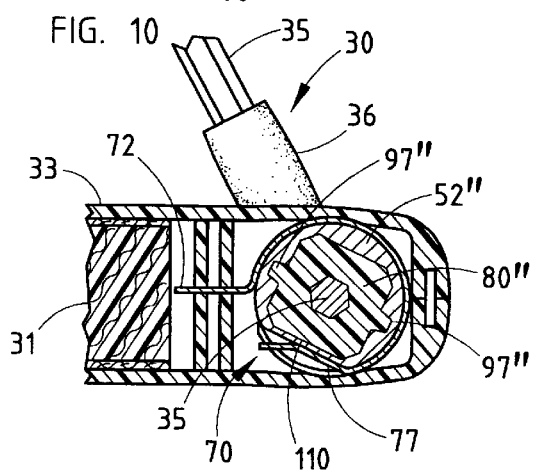
FIG. 10 is an enlarged fragmentary cross-sectional view of yet another embodiment of the visor control of the present invention taken along the same line as FIG. 8.
Figure 11:
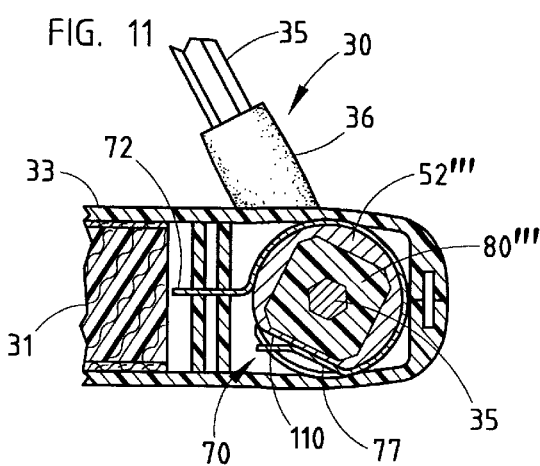
FIG. 11 is an enlarged fragmentary cross-sectional view of yet another embodiment of the present invention, taken along the same section line as FIG. 8.

In the embodiment shown in FIGS. 10 and 11, sleeves 52" and 52''' are provided, each having a generally cylindrical outer surface but with a flat 110 formed thereon such that a tang 77 formed on an alternative embodiment of the torque fitting 70 (shown as 70' in FIG. 12) can engage the flat 110 on sleeves 52" and 52''' providing a snap-up holding action for the visor assembly 20 with respect to the vehicle headliner 18. Tang 77 is formed by a slot 78 in the slide wall of torque fittings 70'. In the embodiment shown in FIG. 10, the slide 80" includes two elongated longitudinally extending outwardly projecting teeth 97" at opposed 180° spaced locations, while in the embodiment shown in FIG. 11 the slide 80''' is square with beveled corners to prevent rotation of the slide 80''' with respect to the sleeve 52'''. The different cross-sectional shapes of the various slides 80—80''', which are integrally molded in situ to conform to the correspondingly shaped extruded sleeves 52—52''', provide somewhat different frictional sliding interface between the slides and sleeves for different desired control sliding effects. It is desired that the slide be injection molded within the sleeve to provide a conforming keyed interface which allows sliding motion between the slide injection mold over the pivot rod and the inner surface of the sleeve. The polymeric material employed for the slide adheres to the outer surface of pivot rod 35 which may be surface textured, if desired, such that no sliding action occurs between the slide 52 and the pivot rod 35. The polymeric material shrinks down onto the pivot rod during the molding process and slightly away from the inner surface 98 of sleeve 52 to assure that the desired sliding interface occurs between the outer surface of slide 80 and the inner surface of sleeve 52 in each of the embodiments.

It will become apparent to those skilled in the art that various modifications to the preferred embodiments of the invention as described herein can be made without departing from the spirit or scope of the invention as defined by the appended claims.

The invention claimed is:

1. A sliding visor assembly comprising:
   a visor body;
   an elongated sleeve mounted within said visor body for rotation with respect to said visor body;
   an elongated visor pivot rod extending in said visor body and having a slide integrally molded thereon, said slide extending in said sleeve, said slide and sleeve keyed to one another to prevent rotation of said slide in said sleeve; and
   a torque fitting extending between said visor body and an outer surface of said sleeve for controlling the rotation of said visor body with respect to said pivot rod while said slide allows said visor body to slide along said pivot rod.

2. The assembly as defined in claim 1 wherein said sleeve includes a flat formed on an outer surface thereon and said torque fitting has a tang engaging said flat to provide snap-up control of said visor.

3. The assembly as defined in claim 1 wherein said slide extends a portion of the length of said sleeve.

4. The assembly as defined in claim 3 wherein said sleeve has a splined inner surface mating with radially extending teeth molded in said slide.

5. The assembly as defined in claim 4 wherein said visor pivot rod has a non-circular cross section.

6. The assembly as defined in claim 5 wherein said polymeric slide is made of a silicone-filled acetal.

7. The assembly as defined in claim 6 wherein said sleeve is extruded of aluminum.

8. A sliding visor control comprising:
   a sleeve having a non-circular interior wall for mounting to a visor body;
   a visor pivot rod concentrically positioned with said sleeve; and
   a polymeric material integrally molded with said sleeve between said visor pivot rod and said sleeve, conforming to said an interior wall of said sleeve for defining a slide member for slidably supporting said pivot rod with respect to said sleeve wherein said sleeve has a generally square interior wall which includes at least one groove.

9. The visor control as defined in claim 8 wherein said sleeve is elongated and said slide extends along a portion of the length of said sleeve.

10. A sliding visor control comprising:
    a sleeve having a non-circular interior wall for mounting to a visor body;
    a visor pivot rod concentrically mounted with said sleeve; and
    a polymeric slide member molded onto said visor rod and having a shape conforming to said an interior wall of said sleeve for slidably supporting said pivot rod with respect to said sleeve, wherein said sleeve is elongated and said slide extends along a portion of the length of said sleeve, and wherein said sleeve has a splined inner surface mating with radially extending teeth molded in said slide;
    a torque fitting extending between said visor body and an outer surface of said sleeve for controlling the rotation of said visor body with respect to said pivot rod while said slide allows said visor body to slide along said pivot rod.

11. The visor control as defined in claim 10 wherein said visor pivot rod has a non-circular cross section.

12. The visor control as defined in claim 11 wherein said polymeric slide is made of silicone-filled acetal.

13. The visor control as defined in claim 12 wherein said sleeve is extruded of aluminum.

* * * * *

UNITED STATES PATENT AND TRADEMARK OFFICE
CERTIFICATE OF CORRECTION

PATENT NO. : 6,174,019 B1
DATED : January 16, 2001
INVENTOR(S) : Collet et al.

It is certified that error appears in the above-identified patent and that said Letters Patent is hereby corrected as shown below:

Column 4,
Line 13, delete "a thermoplastic resin, such as VALOX®" and insert therefor -- in cross section --.

Signed and Sealed this

Fourth Day of December, 2001

*Attest:*

*Attesting Officer*

NICHOLAS P. GODICI
*Acting Director of the United States Patent and Trademark Office*